US 9,832,146 B2

(12) United States Patent
Briand et al.

(10) Patent No.: US 9,832,146 B2
(45) Date of Patent: Nov. 28, 2017

(54) SYSTEM AND METHOD FOR MANAGING FEDERATED MESSAGINGS

(75) Inventors: Olivier Briand, Rennes (FR); Lionel Courval, Amaye sur Orne (FR); Agnès Foucher, Saint-Contest (FR)

(73) Assignee: Orange, Paris (FR)

( * ) Notice: Subject to any disclaimer, the term of this patent is extended or adjusted under 35 U.S.C. 154(b) by 743 days.

(21) Appl. No.: 12/747,228

(22) PCT Filed: Dec. 16, 2008

(86) PCT No.: PCT/FR2008/052324
§ 371 (c)(1),
(2), (4) Date: Jun. 10, 2010

(87) PCT Pub. No.: WO2009/083684
PCT Pub. Date: Jul. 9, 2009

(65) Prior Publication Data
US 2010/0262667 A1   Oct. 14, 2010

(30) Foreign Application Priority Data
Dec. 20, 2007   (FR) ..................................... 07 60118

(51) Int. Cl.
*G06F 15/16*   (2006.01)
*H04L 12/58*   (2006.01)

(52) U.S. Cl.
CPC ............ *H04L 51/066* (2013.01); *H04L 51/36* (2013.01)

(58) Field of Classification Search
CPC .............................. H04L 51/066; H04L 51/36
See application file for complete search history.

(56) References Cited

U.S. PATENT DOCUMENTS

| 5,647,002 | A | * | 7/1997 | Brunson | 709/206 |
| 5,737,395 | A | * | 4/1998 | Irribarren | 379/88.13 |
| 6,711,154 | B1 | * | 3/2004 | O'Neal | 370/352 |
| 6,987,840 | B1 | | 1/2006 | Bosik et al. | |
| 7,711,856 | B1 | * | 5/2010 | Lin et al. | 709/246 |
| 2003/0110297 | A1 | * | 6/2003 | Tabatabai et al. | G06F 17/30905 709/246 |
| 2004/0087300 | A1 | * | 5/2004 | Lewis | 455/412.2 |
| 2006/0047767 | A1 | * | 3/2006 | Dodrill et al. | 709/206 |
| 2007/0192684 | A1 | * | 8/2007 | Bodin | G06F 17/30035 715/234 |
| 2007/0250223 | A1 | * | 10/2007 | Francois et al. | 701/9 |
| 2009/0138562 | A1 | * | 5/2009 | Schmulen et al. | 709/206 |
| 2010/0169424 | A1 | * | 7/2010 | Gustafsson et al. | 709/206 |

FOREIGN PATENT DOCUMENTS

WO   WO 00/45557 A1   8/2000
WO   WO 2006/101428 A1   9/2006

* cited by examiner

*Primary Examiner* — Abdulkader M Alriyashi
(74) *Attorney, Agent, or Firm* — Drinker Biddle & Reath LLP

(57) ABSTRACT

The invention relates to a system for managing messagings comprising a plurality of messagings and adapted for receiving and storing messages intended for at least one user furnished with a plurality of terminals for accessing said messagings. Such a system furthermore comprises: means for centralized management of any event specific to any message stored with said respective messagings; means for processing messages stored by at least one of said messagings to render said messages compatible with at least one second messaging of said plurality of messagings.

9 Claims, 3 Drawing Sheets

SYSTEM AND METHOD FOR MANAGING FEDERATED MESSAGINGS

CROSS-REFERENCE TO RELATED APPLICATIONS

This application is the U.S. national phase of the International Patent Application No. PCT/FR2008/052324 filed Dec. 16, 2008, which claims the benefit of French Application No. 07 60118 filed Dec. 20, 2007, the entire content of which is incorporated herein by reference.

FIELD OF THE INVENTION

The present invention relates to the field of messaging system management.

More specifically, the invention relates to the management of messages (electronic mail, voice messages) in a federated messaging system and, even more specifically, to the management of the consistency of the messages and of access to the media contents in such a federated messaging system.

BACKGROUND

The mostly widely used messaging systems include electronic mail (more commonly referred to as email) and voice messaging services that can be accessed by means of mobile or fixed telecommunication terminals, or even video messaging services that can be used by means of a video phone device.

More often than not, a message consists of a header (sender, receiver, subject of the message, date, etc.) and a body or content, either written in the case of electronic messages (email), or audio (voice messaging in fixed or mobile telephony), or even video in a telephone-video phone context.

Unified messaging systems are known from the prior art that enable a user to access and manage all his messages, regardless of their origin: electronic mail messaging, voice messaging, fax messaging, and by extension video messaging.

Generally, a unified messaging system consists of one or more messaging devices (commonly called messaging "back ends") suitable for managing and storing messages and, associated with each of these messaging devices, one or more interfaces (commonly called messaging "front ends") suitable for managing user access to their respective messaging services.

Also known from the prior art are four types of unified messaging architectures, mostly defined by software publishers and/or manufacturers such as Cisco, Alcatel, 3Com, Avaya, Cycos, Tetco (registered trade marks), for example.

A first type of unified messaging system architecture known from the prior art proposes unifying, on client stations or terminals a user's access to the messaging services with which he has one or more messaging accounts.

In such an architecture, a specific API (application programming interface) is defined to allow access to the voice messages stored on a PBX (private branch exchange, which designates, in a corporate installation, the device for internally exchanging data and linking with the telephone network) via a written messaging software executed on the client station or terminal.

Such a solution is, however, appropriate only for smaller corporate structures (small enterprises, mainly fewer than fifty employees). It is in fact relatively difficult to maintain technically all the software concerning the unification of access to the messages that are remotely cited on the client terminal or station. Furthermore, such an architecture necessitates providing and managing a number of messaging accounts for each user.

A second type of unified messaging system architecture known from the prior art implements synchronization between the various messaging server devices to allow them to be unified, that is to say, to enable the users who have a messaging account to be able to consult their electronic messages in the form of a voice message via their voice messaging service that can be accessed by means of their fixed or mobile communication terminal, and to be able to consult indiscriminately their voice messages that are available on the messaging service of their fixed or mobile telephone, by means of their electronic messaging.

Such a unified messaging system in accordance with this second type of architecture does, however, involve having to replicate the various messages in the respective memory spaces of all the messaging devices (back ends), thereby increasing the cost incurred by the increasing need for storage spaces for the latter. Another drawback for this kind of system is that it generates synchronization conflicts that are often difficult to resolve, with regard to unified access to the messages when the latter are of different types or formats in particular. Such a solution according to the prior art is also very costly and ill suited to implementation in the form of a service intended for the general public.

A third type of unified messaging system architecture known from the prior art aims to merge the various messaging devices, that is to say to merge the various "back ends", so as to store all the messages received from these various messaging "back ends" on one and the same messaging server. It also makes it possible to avoid the replication of the messages on each messaging device, as in the case of the second architecture described hereinabove.

Such an approach according to the prior art does, however, have the drawback of requiring the respective technologies of the various messaging devices (back ends in particular) to be fundamentally sufficiently open and advanced to be able to be adapted to such an implementation possibility, which is rarely the case.

However, even assuming such openness and open-endedness of the latter, a drawback in this third type of architecture is linked to the fact that it demands data migrations that are often costly and risky, the latter generally inducing data losses relating to the stored messages.

A fourth type of unified messaging system architecture known from the prior art consists in unifying the communication system around a central directory.

According to such a solution, all the messages are stored centrally, as is the management of access to his messaging service by a user, in all its forms: electronic messages (email), audio/voice messages, video or fax messages.

Such an approach according to the prior art is relatively recent. It is as yet unproven but is already proving costly in terms of management and technical support of the hardware and software infrastructure that it requires to be implemented to be able to function.

The present invention offers a solution that does not have the drawbacks described hereinabove in relation to the various known types of unified messaging system architectures according to the prior art.

SUMMARY

The invention aims to resolve the abovementioned drawbacks by proposing a method and a system for federated management of a set of multimedia messaging services that provides inexpensive and risk-free, coherent and unified management of all the messages of heterogeneous formats stored with each of said messaging services (electronic messaging, voice/audio messaging, video messaging, etc.) for a user.

The terms "messaging service" and "messaging device" are used interchangeably hereinafter in this document to mean any set formed by the messaging interface, called messaging "front end" and by the messaging device, called messaging "back end", comprising storage means for the messages of users who have a messaging account.

To this end, the invention relates to a system for managing messaging services comprising a plurality of messaging services suitable for receiving and storing messages intended for at least one user having a plurality of terminals for accessing said messaging services.

According to the invention, such a system also advantageously comprises:

means for centrally managing any event specific to any message stored with said respective messaging services;

means for processing messages stored by at least one of said messaging services to make said messages compatible with at least a second messaging service of said plurality of messaging services.

Such a federated messaging system according to the invention enables the users to profit from unified access to all the messages available with their various messaging devices, from their distinct, even heterogeneous, access terminals.

Thus, when a new message of a predetermined type is posted on a messaging device corresponding to a user, the other messaging devices are each informed thereof, the new received message being catalogued centrally in a referencing database for all the messages seen by each of the messaging devices constituting said system according to the invention.

Thus, as a simple illustrative and non-limiting example, if a user of the federated messaging system according to the invention has a user account with an electronic messaging service, a fixed voice messaging service accessible via a fixed telephone, a mobile voice messaging service accessible via his cell phone and a video messaging service accessible via his video phone, when a new voice message is posted on one of his messaging services, the other messaging services are directly informed thereof via their respective interfaces (or messaging "front ends") and the new message is catalogued in a central database, called reference database, containing information relating to all the federated messages.

Since the user has a number of messaging services referenced in a messaging profile that is specific to that user with said system according to the invention, the new voice message is then translated into a format compatible with the other messaging devices with which said user has a messaging account.

For example, if the new voice messages is posted with a messaging device in G.711 audio format, it will then be processed by the processing means of the system according to the invention to be translated into an MP3-compatible type format to be consulted in the form of an electronic mail via the interface for consulting the electronic mail device.

One advantage of the federated messaging system according to the invention is that it requires no hardware or software modification of the various messaging devices (messaging "back ends") that it incorporates, said messaging devices still being used to physically store the messages posted with them in a predetermined format.

In this system, advantageously, means are simply added that are shared between the various messaging devices, these means taking the form of a database, called messaging referencing database, containing the headers of all the messages with which there is associated a pointer to the physical message which is still stored on the messaging device (back end) by means of which it was received.

An interface manager associated with each messaging device makes it possible to update the message referencing database so as to maintain the overall consistency of all the messages referenced in the database that can be seen by all the messaging devices that make up the system.

Thus, in the same way as for the management of an event corresponding to the arrival of a new message posted with a messaging device, any event relating to the deletion of a message will be notified to the various other messaging devices and the deleted message will on the one hand be removed from the referencing database and, on the other hand, will be physically deleted from the memory space of the messaging device in which it was physically stored.

The messaging service management system according to the invention finally requires only little in the way of hardware and/or software development inasmuch as it makes it possible to take account of the existing system by adapting to the latter, while ensuring maximum capability for unification of the messages on the various messaging servers.

It also favors unified consultation of the messages both via the various available consultation interfaces (messaging front ends), and via a unified interface allowing consultation of all the different types of messages received with these different servers.

Preferentially, said processing means are means for translating a new message received in a first format compatible with a first of said messaging services into the form of at least one translated message in a predetermined second format compatible with at least a second of said messaging services.

Thus, a message stored in a first compatible format on a first messaging device would be read by its recipient user via a consultation interface associated with a messaging device compatible with a second message format. Such an approach according to the invention thus makes it possible to provide a federated management, that is both a consistent and overall management of all the messages stored on each of said messaging devices, by the creation of a dialog between the different devices. Such a dialog is based on a translation of the messages stored in a first format on a first messaging device into at least one second compatible format for consultation of the same message by means of each of the other messaging devices with which the recipient of said message has a messaging account.

Advantageously, the system according to the invention comprises means of notifying any event relating to any new message received by one of said messaging services, addressed to all of said other messaging services.

The aim is notably to allow all the messaging devices attached to said system to be informed in real time of the arrival of any new message with one of the messaging devices, so that this message can then be consulted indiscriminately by the recipient user of said new message, by means of any one of his messaging interfaces.

Advantageously, the system according to the invention comprises means of notifying any event relating to a message stored in a memory space of one of said messaging services, addressed to all of said other messaging services.

The aim here is that any messaging service can be informed of any event that occurs relating to message stored with any one of said messaging services, for example a deletion request event, so that such a deleted message can no longer be seen by any of said messaging services.

In a specific embodiment of the invention, said second predetermined format is a generic format, called pivot format, compatible with the largest number of message formats accepted by said messaging services of said plurality of messaging services.

Such an embodiment offers the advantage of limiting the number of message conversions from one format to other formats. This entails determining the format for conversion of a message from an initial format, which is compatible for possible consultation via the greatest number of messaging services available for a user. Such a format, called intermediate pivot format, could also be specified in each of the messaging profiles previously defined for each user having one or more messaging accounts (email, voice, video, fax, etc.).

Preferentially, said centralized management means comprise at least one referencing database for all the messages received by each of said messaging services, said database being able to collaborate with said translation means.

The use of such a database for the central and shared referencing of all the messages stored with the various messaging services (back ends) makes it possible to provide both consistent and overall management of all the messages and unified access to all the latter, which then become consultable by their respective recipients, from any one of their messaging consultation interfaces.

A user could thus consult a voice message initially posted on his voice messaging service (fixed or mobile) in the form of a written electronic message, or even consult one of his emails, initially posted on his electronic messaging service, in an audio format and by means of the voicemail box of his voice messaging service that can accessed from his fixed or mobile telephone.

In an advantageous embodiment of the invention, said referencing database comprises, for each referenced message:
  a unique identifier of said referenced message;
  an access pointer to said message stored with one of said messaging services.

Thus, in the system according to the invention, the messaging services (back ends) used to store their own types of messages are not modified, nor are the interfaces (front ends) for consulting such messaging services, but, advantageously, a simple database is simply added that contains the headers of all the messages, each of these headers being associated with an access pointer to the physical message stored with one of said messaging services. Such an approach ensures overall consistency of the view of all the messages shared by each of said messaging services.

In a specific embodiment of the invention, the system according to the invention also comprises means of managing user accounts allocated to the various messaging services, each of said messaging services on which a given user has a messaging service account being referenced in a messaging service profile defined for said given user.

A user profile will advantageously contain the different multimedia message formats compatible with the messaging device with which said user has a messaging account, so as to be able to anticipate any message translation into one of these compatible formats.

The invention also relates to a federated messaging platform comprising a messaging management system in accordance with the system described hereinabove.

Such a platform according to the invention allows translation of the messages into the different formats, with no longer any need for such a translation to be done in real time each time a new message arrives on one of said messaging services.

It also obviates the need for any replication of the messages as in the systems known from the prior art.

The invention also relates to a method for managing a messaging system comprising a plurality of messaging services suitable for receiving and storing messages intended for at least one user having a plurality of terminals for accessing said messaging service.

According to the invention, such a method advantageously comprises:
  a step for centrally managing any event specific to any message stored with said respective messaging services;
  a step for processing messages stored by at least one of said messaging services to make said messages compatible with at least one second messaging service of said plurality of messaging services.

In a preferred embodiment of the invention, said processing step is a step for translating a new message received in a first format compatible with a first of said messaging devices, into the form of at least one translated message in a predetermined second format compatible with at least a second of said messaging devices.

Preferentially, said processing step is a step for translating a new message received in a first format compatible with a first of said messaging services into the form of at least one translated message in a predetermined second format compatible with at least a second of said messaging services.

Preferentially, said method comprises a step for notifying any event relating to any new message received by one of said messaging services, addressed to all of said other messaging services.

The invention also relates to a computer program product that can be downloaded from a communication network and/or stored on an information medium that can be read by computer and/or executed by a microprocessor, such a computer program product comprising code instructions for executing a method for managing a system of messaging services in accordance with the abovementioned method, when it is executed on a computer terminal.

BRIEF DESCRIPTION OF THE DRAWINGS

The features and technical advantages of the present invention will become more apparent from the following description, given as a non-limiting indication, in light of the appended drawings in which.

DETAILED DESCRIPTION

Figure 1:
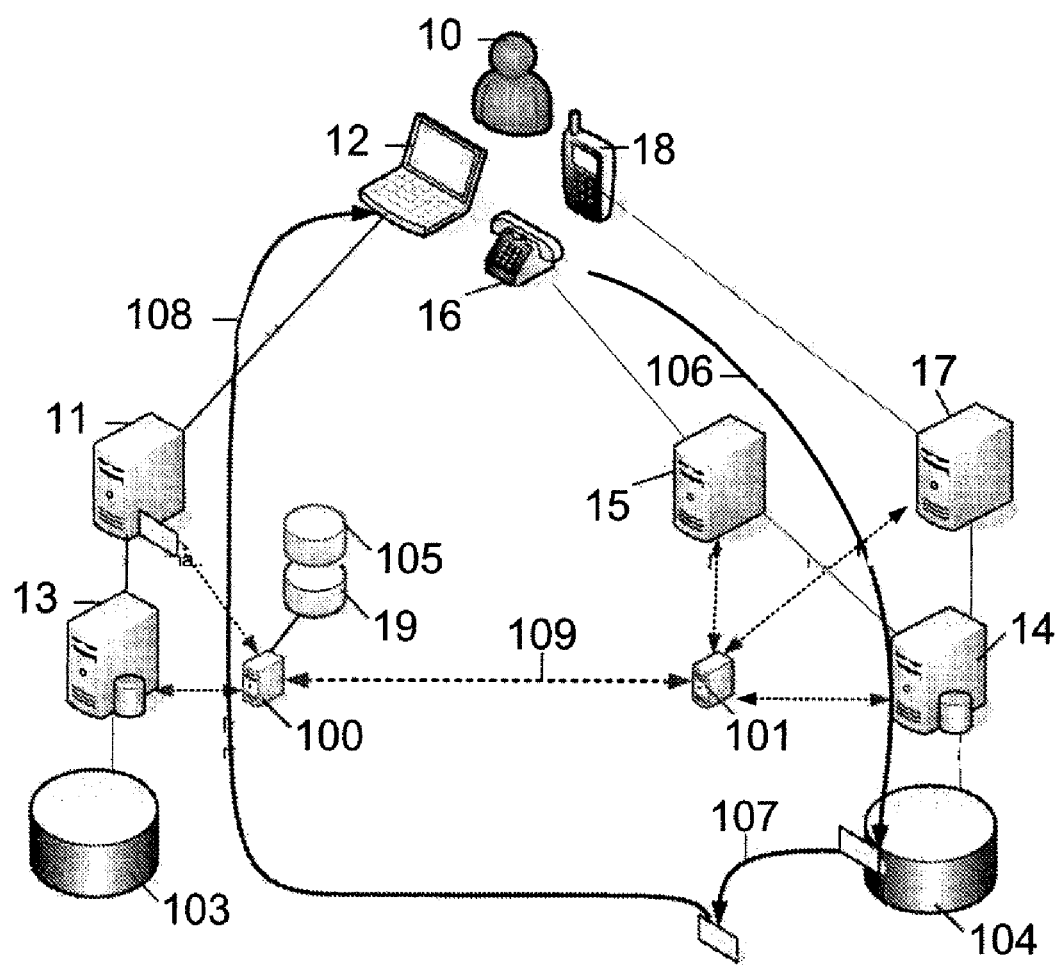
FIG. 1 gives an example of the hardware architecture of a federated messaging service management system according to the invention.

FIG. 1 illustrates a user 10 of a federated messaging system according to the invention, it being possible for this system to be in the form of a federated messaging platform.

As illustrated in the figure, the user 10 has an electronic mail messaging service (mail "back end") 13 that can be accessed via a messaging service (mail "front end" 11 that is able to collaborate with a terminal 12 of the computer terminal type in order to consult electronic messages. The user 10 also has a voice messaging service 14 (audio "back end") that can be accessed via a messaging service "fixed audio front end" 15 able to collaborate with a terminal of the fixed telephone type 16, or via a messaging service "mobile front end" 17 able to collaborate with a mobile terminal 18 of the cell phone type.

In accordance with the invention, a database 19 that is used to reference all the messages stored with the various messaging service "back ends" (13, 14) is shared between the latter, so as to provide them with a consistent and overall view of all the messages of different formats that can be accessed by the user 10 via his consultation terminals (12, 16, 18). This database 19 contains the headers of all the messages of various types respectively stored on each of the messaging service management devices (13, 14) (messaging service "back ends"), each of these message headers being associated in the database 19 with a pointer for addressing the corresponding physical message stored on one of the messaging service devices (13, 14).

Each messaging service "back end" (13, 14) comprises at least one database (respectively referenced 103, 104 in FIG. 1) for storing the corresponding format messages.

The system according to the invention also provides an interface manager 100, 101 able to collaborate respectively with each messaging service "back end" 13, 14. These interface managers 100, 101 (one for each messaging service "backend") form means of centrally managing events associated with each of the messages stored with the various "back ends" 13 and 14. They are designed to update the database 19 used to reference all the messages stored in the databases 103, 104 of each of the messaging service "back ends" 13, 14. They are designed to collaborate with means of processing said events shared between each of said messaging devices 13, 14.

When a voice or video message is posted on one of the messaging devices 13, 14, the other messaging devices are automatically informed via the interface managers 100, 101 described hereinabove and the message is catalogued in the reference database 19.

Since the user 10 therefore has a number of messaging services (11, 12, 13) or (14, 15, 16; 14, 17, 18) referenced in a messaging profile stored in a database 105 containing user messaging profiles, the voice or video message is then translated into a format that can be utilized by the other messaging services via which the user 10 can then access the initially posted voice message.

Thus, the database 19 for referencing the messages contains the information specific to all the messages that can be consulted through the federated messaging system according to the invention, as well as the physical location of the latter in the databases 103, 104 of the various messaging devices 13, 14 and for each user for which they are intended.

The database 105 of user profiles contains all the various types of messaging devices 13, 14 with which the users of said system according to the invention have messaging accounts, and, for each of these messaging devices 13, 14, the message formats supported by the latter, respectively.

For example, if a voice message is posted 106 in the G711 audio format, the latter will then be translated 107 into the MP3 format to be able then to be accessed and/or consulted 108 in the form an electronic mail by means of the computer terminal 12 on which a messaging client (dedicated software application) is executed.

The format for translating or transcoding a message posted in a first format could advantageously take the form of a more widely used generic format, such as the MP3 format for voice messages. Such a format will be called "pivot" format.

In order to avoid multiplying the number of stored formats, the pivot format will preferably be the only one to be retained in addition to the original format.

In relation to FIG. 1, the following two usage scenarios are presented as simple illustrative and non-limiting examples of the invention.

The first scenario concerns a user who has a first messaging account on a video messaging device of the "video messaging back end" type and a second messaging account on a mobile voice messaging device.

In the context of this usage scenario:

a video message (usually consultable by means of a video phone-type telephone) is received in the MP4 video format (H264 video codec and AAC audio codec);

the message is notified, via an interface manager 100 or 101, to the mobile voice messaging device. It is also catalogued in the message referencing database 19;

the user 10 who also has a mobile voice messaging service that supports files in the AMR format (AMR standing for "adaptative multi-rate codec, an audio format used on cell phones to code recordings and the audio content of MMS (multimedia message service) messages), the initial message in the MP4 format is then translated into the AMR format, according to the translation rules previously entered in the profile stored in the profiles database 105, for said user 10. The reference database 19 contains the header of the video message (sender, recipient, subject, time stamp, etc.) and the different formats available (for example MP4, H264, AAC et AMR) in which this message can indiscriminately be consulted by the user 10;

if the user 10 wants to consult his messages from his mobile messaging service, he can then listen to the message in the AMR format.

The second scenario concerns a user who has a first messaging account on an electronic messaging device of the "electronic messaging back end" type and a second messaging account on a fixed voice messaging device.

In the context of this usage scenario, and as illustrated in FIG. 1:

a voice message is received 106 in the G711 format on the audio "back end" 14 of the voice messaging device of the user 10;

the received message is notified 109, via the interface manager 100, 101, to the mobile voice messaging management device 14 and to the electronic messaging device 13. It is also catalogued in the message referencing database 19;

since the user 10 also has an electronic messaging service that supports MP3 format files, the voice message is then translated into the MP3 format, according to the translation or transcoding rules previously defined in a profile of said user 10, in the user profiles database 105. The reference database 19 then contains the header of the message (sender, recipient, subject, time stamp, etc) and its available formats (G711 and MP3);

when the user 10 wants to consult his messages from his mail service, he can then listen to the message in the MP3 format in streaming mode on his PC or his PDA.

The pivot format mentioned above is useful when the user 10 has a messaging account with a number messaging devices each supporting different message formats. In this case, the pivot format minimizes the cost of storing the message and keeping maximum accessibility to the content, while minimizing the transcoding operations required.

Figure 2:
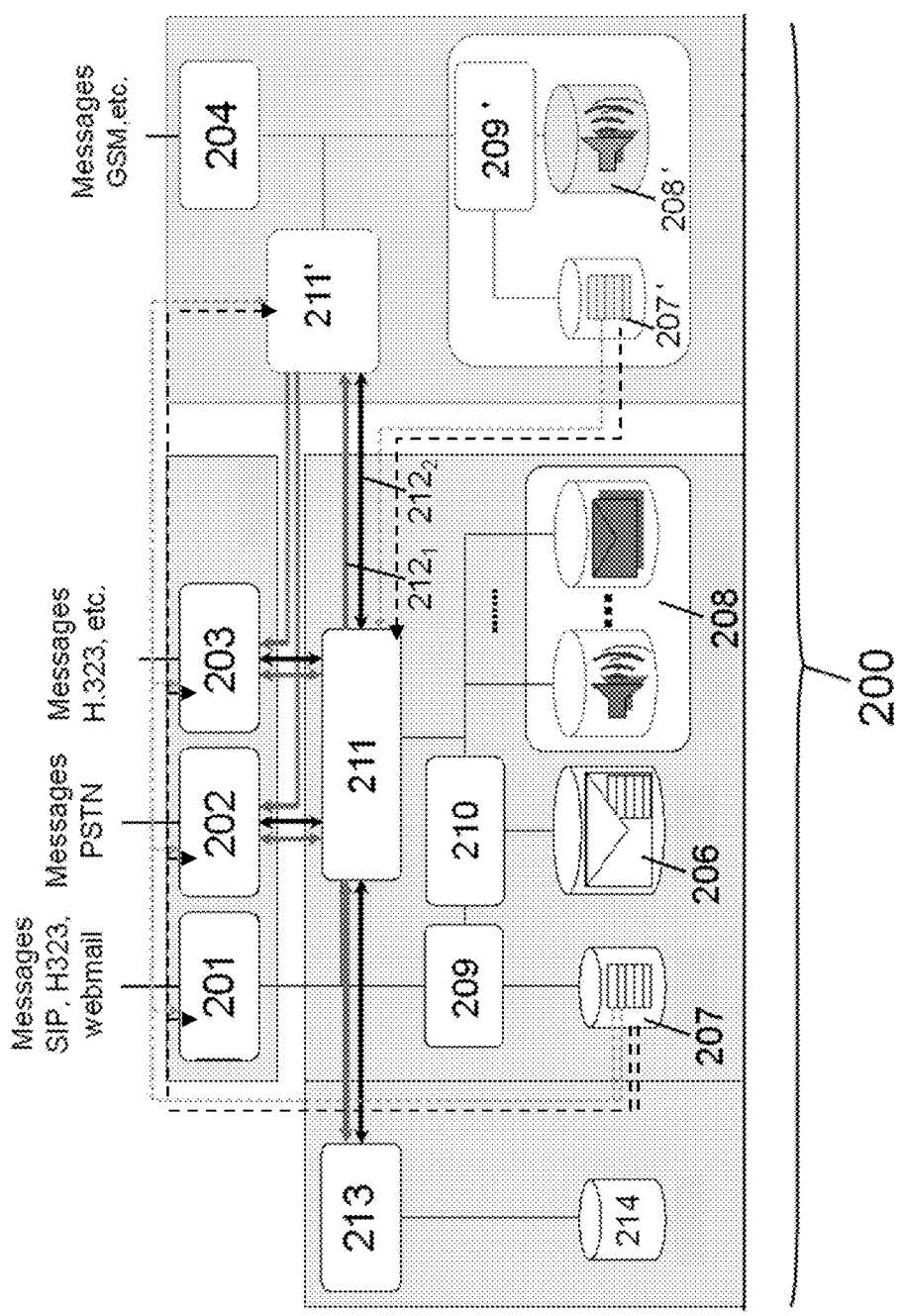
FIG. 2 shows a detailed architecture of the federated messaging system according to the invention.

As illustrated in FIG. 2, in an advantageous embodiment of the invention, the federated multimedia messaging management system takes the form of a federated messaging platform 200.

In the example of FIG. 2, such a platform 200 enables a user to access:

messages in SIP, H.323, or even web mail format via an electronic messaging "front end" 201;

messages in PSTN format via a voice messaging "front end" 202 that can be accessed from a fixed telephone type terminal in the home;

multimedia-format messages conforming to the H.323 or other standards, via an appropriate messaging "front end" 203;

GSM messages in audio or other formats, via a voice messaging "front end" 204 that can be accessed from a cell phone type terminal.

Such a federated messaging platform 200 comprises a database 206 for referencing all the messages physically stored in the specific databases (208, 208') administered by each of the "back ends" (209, 209') of the various messaging devices (201, 209) (202, 209) (203, 209) and (204, 209') (messaging "front ends" and "back ends") administered in a unified way by means of said platform 200.

A message manager 210 of said platform 200 provides coherent management and administration of all the messages contained in each of the databases 208 and 208' so that all the messaging devices (201, 209) (202, 209) (203, 209) and (204, 209') can share at any instant one and the same view of all these messages referenced in the message referencing database 206.

Databases 207 and 207' containing messaging profiles associated with each user account and, for each one, containing referenced users, all the messaging devices accessible to the latter, and all the message formats supported by the consultation interfaces (terminal, webmail client, etc.) available to them.

Specific interfaces 211 and 211' allow dialog ($212_1$, $212_2$) between the various messaging devices so that the latter can share one and the same view of all the messages stored with each of them and overall catalogued/referenced in the referencing database 206. They also serve as means for notifying of any events concerning newly arrived messages or messages stored on all the other messaging devices.

Such interfaces 211 and 211' are also used to supply the message translation means 213 with messages that have a first predetermined format compatible with at least one of the messaging devices (201, 209) (202, 209) (203, 209) and (204, 209') in order to produce a translated message in a second format compatible with at least one other of said messaging devices (201, 209) (202, 209) (203, 209) and (204, 209'). These translation means 213 constitute one of the cornerstones of the invention since they guarantee that a user can access and consult his messages that are available with the various messaging devices (electronic mail, fixed or mobile voice messaging, video messaging, etc.) in a unified manner by means of any one his communication terminals. Specifically, he could indiscriminately consult one of his electronic mails previously translated by the translation means 213 (transcoding means for example) in the form of an audio message, by means of the voice messaging service of his fixed telephone or his cell phone or even read, in the form of an electronic mail, a voice message initially posted on one of his fixed telephone or cell phone voicemail boxes, after the latter has been converted by the translation means 213.

In the example of FIG. 2, and in order to facilitate the translation of the messages (the transcoding of the messages, for example), the translation means 213 use a cache memory 214.

Each messaging device (201, 209) (202, 209) (203, 209) and (204, 209') stores messages that correspond to its own compatible formats.

The message referencing database 206 contains identifiers of messages associated with pointers to the physical messages stored with the various messaging devices (201, 209) (202, 209) (203, 209) and (204, 209'), such pointers being able, advantageously, to take the form of a URL ("Uniform Resource Locator", to use the widely adopted terminology).

Such a platform according to the invention allows the messages to be translated into the different formats, with there no longer being any need for such a translation to be done in real time each time a new message arrives on one of said messaging devices.

It also obviates the need for any message replication as in the systems known from the prior art.

Figure 3:
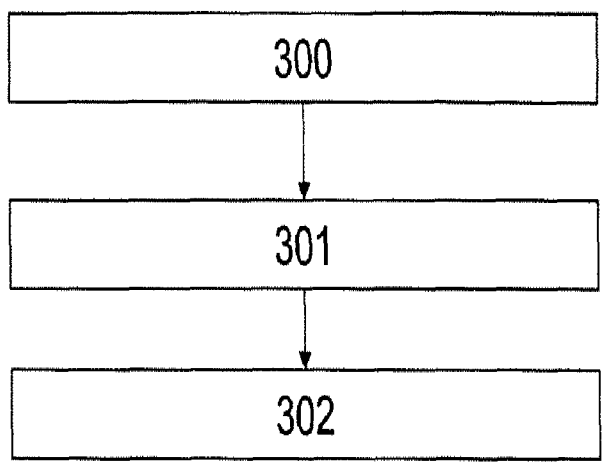
FIG. 3 is a block diagram summarizing the major steps of the method for managing a system of multimedia messaging services according to the invention.

Finally, FIG. 3 summarizes the major steps of the method for managing a system of multimedia messaging services in accordance with the system, said system comprising:

a plurality of messaging devices suitable for receiving and storing multimedia messages of predetermined format and intended for a recipient user identified with said messaging system;

a plurality of messaging applications each linked to at least one of said messaging devices of corresponding type, to enable said recipient user to manage said multimedia messages of predetermined format.

According to the invention, such a method advantageously comprises:

a step (300) for centrally managing events respectively associated with each of the messages stored with said messaging devices;

a step (301) for processing said events, the result of which is shared between each of said messaging devices, the processing being able, advantageously, to take the form of a translation of a new message received in a first format compatible with a first of said messaging devices into the form of at least one translated message in a second predetermined format compatible with at least a second of said messaging devices, in a preferred embodiment of the invention.

Such a method according to the invention comprises a step 302 for notifying any event relating to any new message received by one of said messaging devices to all said other messaging devices.

The invention therefore offers a novel architecture and a novel federated messaging management method, that is both simple and inexpensive to implement on a foundation consisting of existing hardware and software, while advantageously allowing a user to access all his messages available with distinct and often heterogeneous messaging accounts, indiscriminately from any one of his communication terminals.

The invention claimed is:

1. A system for managing messaging services comprising a plurality of messaging devices suitable for receiving and storing messages intended for at least one user having a plurality of terminals for accessing said plurality of messaging devices, said system comprising:

a computer processor;

one or more centralized management devices for centrally managing any event specific to any message stored with one or more of the plurality of messaging devices;

at least one database for referencing all the messages received by each of said plurality of messaging devices;

at least one translation device for translating a new message received in a first format by a first messaging device of said plurality of messaging devices into a translated message in a predetermined second format, wherein the new message is translated prior to receipt of a request for the new message from any of said plurality of messaging devices other than said first messaging device, said predetermined second format being a generic format selected by:

identifying message formats accepted by said plurality of messaging devices;

determining for each of said identified message formats a number of said plurality of messaging devices that accept the respective format; and selecting, as said predetermined second format, a format among said identified message formats having a highest value of said determined number;

wherein the one or more centralized management devices processes messages stored by at least one of said plurality of messaging devices and updates said at least one referencing database, such that said at least one referencing database at least comprises, for each referenced message:

a single identifier, common to said plurality of messaging devices, to uniquely identify said referenced message to each of the plurality of messaging devices independently of said first format of the referenced message, different formats available for the referenced message, said different formats including said predetermined second format, and an access pointer to a corresponding physical message stored in said first format within one of said plurality of messaging devices.

2. The system as claimed in claim 1, comprising a device for notifying any event, relating to any new message received by one of said plurality of messaging devices, to all other messaging devices of the plurality of messaging devices.

3. The system as claimed in claim 1, comprising a device for notifying any event, relating to a message stored in a memory space of one of said plurality of messaging devices, to all other messaging devices of said plurality of messaging devices.

4. The system as claimed in claim 1, wherein said at least one referencing database is able to collaborate with said translation device.

5. The system as claimed in claim 1, further comprising a device for managing user accounts allocated to the plurality of messaging devices, each of said plurality of messaging devices on which a given user has a messaging service account being referenced in a messaging service profile defined for said given user.

6. A messaging service management platform, comprising the system for managing messaging services as claimed in claim 1.

7. A method for managing a messaging system comprising a plurality of messaging devices suitable for receiving and storing messages intended for at least one user having a plurality of terminals for accessing said plurality of messaging devices, said method comprising:

centrally managing any event specific to any message stored with one or more of the plurality of messaging devices, said centrally managing including referencing of all the messages received by each of said plurality of messaging devices, in at least one referencing database;

translating a new message received in a first format by a first of said plurality of messaging devices into at least one translated message in a predetermined second format, wherein the new message is translated prior to receipt of a request for the new message from any of said plurality of messaging devices other than said first messaging device, said predetermined second format being a generic format selected by:

identifying message formats accepted by said plurality of messaging devices;

determining for each of said identified message formats a number of said plurality of messaging devices that accept the respective format; and selecting, as said predetermined second format, a format among said identified message formats having a highest value of said determined number;

processing messages stored by at least one of said plurality of messaging devices and updating said at least one referencing database, such that said at least one referencing database at least comprises, for each referenced message:

a single unique identifier, common to said plurality of messaging devices, to uniquely identify said referenced message to each of the plurality of the messaging devices independently of said first format of the referenced message, different formats available for the referenced message, said different formats including said predetermined second format, and an access pointer to a corresponding physical message stored in said first format within one of said plurality of messaging devices.

8. The method as claimed in claim 7, comprising notifying any event, relating to any new message received by one of said plurality of messaging devices, to all other messaging devices of the plurality of messaging devices.

9. A computer program product, stored on a non-transitory information medium that can be executed by a microprocessor, comprising code instructions for executing the method for managing a system of messaging services as claimed in claim 7.

* * * * *